(12) United States Patent
Bringewatt et al.

(10) Patent No.: US 12,400,139 B2
(45) Date of Patent: Aug. 26, 2025

(54) SYSTEMS AND METHODS FOR MEASUREMENT OF FIELD PROPERTIES USING QUANTUM SENSOR NETWORKS

(71) Applicants: University of Maryland, College Park, College Park, MD (US); Government of the United States of America as Represented by the Secretary of Commerce, Gaithersburg, MD (US)

(72) Inventors: Jacob Bringewatt, Hyattsville, MD (US); Przemyslaw Bienias, San Francisco, CA (US); Timothy Qian, Rockville, MD (US); Igor Boettcher, Washington, DC (US); Alexey Gorshkov, Potomac, MD (US)

(73) Assignees: University of Maryland, College Park, College Park, MD (US); Government of the United States of America as Represented by the Secretary of Commerce, Gaithersburg, MD (US)

( * ) Notice: Subject to any disclaimer, the term of this patent is extended or adjusted under 35 U.S.C. 154(b) by 355 days.

(21) Appl. No.: 17/978,420

(22) Filed: Nov. 1, 2022

(65) Prior Publication Data
US 2023/0259806 A1    Aug. 17, 2023

Related U.S. Application Data

(60) Provisional application No. 63/263,426, filed on Nov. 2, 2021.

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
None
See application file for complete search history.

(56) References Cited

U.S. PATENT DOCUMENTS

| 10,007,885 | B1 * | 6/2018 | Gorshkov | G01N 24/008 |
| 2020/0201933 | A1 * | 6/2020 | Gorshkov | G01N 24/008 |
| 2024/0142559 | A1 * | 5/2024 | Zhang | G01S 3/48 |

OTHER PUBLICATIONS

Adam Ehrenberg, et al., "Minimum entanglement protocols for function estimation", NIST/University of Maryland College Park, pp. 1-15, Sep. 7, 2022.

(Continued)

*Primary Examiner* — Raymond L Nimox
(74) *Attorney, Agent, or Firm* — George Likourezos; Carter, DeLuca & Farrell LLP

(57) ABSTRACT

A system for the measurement of field properties includes a quantum system, a processor, and a memory. The quantum system includes a plurality of quantum sensors coupled to a field. Each sensor of the plurality of quantum sensors is located at a position in the field. The position depends on parameters. Each sensor of the plurality of quantum sensors is entangled. The memory includes instructions stored thereon, which, when executed by the processor, cause the quantum system to: access a signal of the quantum system; sense a plurality of interdependent a local field amplitudes corresponding to the plurality of quantum sensors by locally probing the field by each sensor of the plurality of quantum sensors; estimate a function of the parameters at a position $x_0$, where $x_0$ is a position without a quantum sensor of the plurality of quantum sensors; and estimate an amplitude of the field at the position $x_0$ based on the estimated function of the parameters.

16 Claims, 2 Drawing Sheets

(56) References Cited

OTHER PUBLICATIONS

Zachary Eldredge, et al., "Erratum: Optimal and secure measurement protocols for quantum sensor networks", Physical Review A 105, p. 1, Jan. 24, 2022.

Zachary Eldredge, et al., "Optimal and secure measurement protocols for quantum sensor networks", Physical Review A 97, pp. 1-9, Apr. 23, 2018.

Kevin Qian, et al., "Heisenberg-scaling measurement protocol for analytic functions with quantum sensor networks", Physical Review A 100, 042304, , pp. 1-8, Oct. 7, 2019.

* cited by examiner

SYSTEMS AND METHODS FOR MEASUREMENT OF FIELD PROPERTIES USING QUANTUM SENSOR NETWORKS

CROSS-REFERENCE TO RELATED APPLICATION/CLAIM OF PRIORITY

This application claims the benefit of, and priority to, U.S. Provisional Patent Application No. 63/263,426, filed on Nov. 2, 2021, the entire contents of which are hereby incorporated herein by reference.

GOVERNMENT SUPPORT

This invention was made with government support under W911NF-16-1-0349 awarded by the Army Research Laboratory-Army Research Office, FA9550-19-1-0275 awarded by the Air Force Office of Scientific Research, and PHY1430094 awarded by the National Science Foundation. The government has certain rights in the invention.

TECHNICAL FIELD

The present disclosure relates generally to the field of quantum operations. More specifically, the present disclosure provides at least a system and method for the measurement of field properties using quantum sensor networks.

BACKGROUND

Harnessing entanglement between many particles is key to a quantum advantage in applications including sensing and timekeeping, secure communication, and quantum computing. Encoding quantum information into a multiqubit Greenberger-Horne-Zeilinger-like state is particularly desirable as a subroutine in many quantum applications, including metrology, quantum computing, anonymous quantum communication, and quantum secret sharing.

Accordingly, there is interest in the measurement of field properties using quantum sensor networks.

SUMMARY

An aspect of the present disclosure provides a system for the measurement of field properties. The system includes a quantum system, a processor, and a memory. The quantum system includes a plurality of quantum sensors coupled to a field. Each sensor of the plurality of quantum sensors is located at a fixed position in the field. The fixed position depends on parameters. Each sensor of the plurality of quantum sensors is entangled. The memory includes instructions stored thereon, which, when executed by the processor, cause the quantum system to: access a signal of the quantum system; sense a plurality of interdependent local field amplitudes corresponding to the plurality of quantum sensors by locally probing the field by each sensor of the plurality of quantum sensors; estimate a function of the parameters at a position $x_0$, wherein $x_0$ is a position without any of the plurality of quantum sensors; and estimate an amplitude of the field at the position $x_0$ based on the estimated function of the parameters.

In accordance with aspects of the disclosure, the estimate of the amplitude of the field at a position $x_0$ may be based on measurements of a final state of the field, specified by a set of operators $\{\hat{\Pi}_\xi\}$ that constitute a positive operator-valued measure where $\int d\xi \hat{\Pi}_\xi = 1$.

In an aspect of the present disclosure, the field may include local field amplitudes.

In another aspect of the present disclosure, the instructions, when executed, may further cause the system to determine an optimum quantum sensor placement in the field based on the estimated function of the parameters.

In yet another aspect of the present disclosure, the instructions, when executed, may further cause the system to determine a mean squared error (MSE) of the estimated function of the parameters from a true value of the parameters.

In accordance with further aspects of the present disclosure, the instructions, when executed, may further cause the system to evaluate the MSE of the estimated function for any set of positions of the plurality of quantum sensors and change the position of each sensor of the plurality of quantum sensors based on the evaluated MSE.

In an aspect of the present disclosure, the plurality of quantum sensors may include Mach-Zehnder interferometers or qubits.

In another aspect of the present disclosure, each sensor of the plurality of quantum sensors may be associated with a Hilbert space.

In yet another aspect of the present disclosure, the values of the parameters at the fixed positions in the field may be unknown.

An aspect of the present disclosure provides a method for the measurement of field properties. The method includes accessing a signal of a quantum system. The quantum system includes a plurality of quantum sensors coupled to a field. Each sensor of the plurality of quantum sensors is located at a fixed position in the field. The fixed position depends on parameters. The values of the parameters are unknown. Each sensor of the plurality of quantum sensors is entangled. The method further includes sensing a plurality of interdependent local field amplitudes corresponding to the plurality of quantum sensors by locally probing the field by each of the plurality of quantum sensors; estimating a function of the parameters at a position $x_0$ based on the sensed plurality of interdependent local field amplitudes, wherein $x_0$ is a position without any of the plurality of quantum sensors; and estimating an amplitude of the field at the position $x_0$ based on the estimated function of the parameters.

In another aspect of the present disclosure, the estimate of the field value at a position $x_0$ may be based on measurements of a final state, specified by a set of operators $\{\hat{\Pi}_\xi\}$ that constitute a positive operator-valued measure where $\int d\xi \hat{\Pi}_\xi = 1$.

In yet another aspect of the present disclosure, the field may include local field amplitudes.

In yet another aspect of the present disclosure, the method may further include determining optimum quantum sensor placement in the field based on the estimated function of the parameters.

In another aspect of the present disclosure, the method may further include determining a mean squared error (MSE) of the estimated function of the parameters from a true value of the parameters.

In yet another aspect of the present disclosure, the method may further include evaluating the MSE for any set of positions of the plurality of quantum sensors and changing the position of each sensor of the plurality of quantum sensors based on the evaluated MSE.

In a further aspect of the present disclosure, the plurality of quantum sensors may include Mach-Zehnder interferometers or qubits.

In a further aspect of the present disclosure, each sensor of the plurality of quantum sensors may be associated with a Hilbert space.

An aspect of the present disclosure provides a method for the measurement of field properties. The method includes accessing a signal of a quantum system, the quantum system includes a plurality of entangled quantum sensors coupled to a field. Each sensor of the plurality of entangled quantum sensors is located at a fixed position in the field. The fixed position depends on a set of parameters. The values of the parameters are unknown. The method may further include sensing a local field value corresponding to a signal sensed by each sensor of the plurality of quantum sensors and estimating a function of the parameters at a first position in the field, wherein the first position is a position in the field without any of the plurality of entangled quantum sensors.

In another aspect of the present disclosure, each sensor of the plurality of quantum sensors may be associated with a Hilbert space.

In yet another aspect of the present disclosure, the plurality of quantum sensors may include Mach-Zehnder interferometers or qubits.

Further details and aspects of exemplary aspects of the present disclosure are described in more detail below with reference to the appended figures.

BRIEF DESCRIPTION OF THE DRAWINGS

A better understanding of the features and advantages of the present disclosure will be obtained by reference to the following detailed description that sets forth illustrative aspects, in which the principles of the present disclosure are utilized, and the accompanying drawings of which.

DETAILED DESCRIPTION

Figure 1:
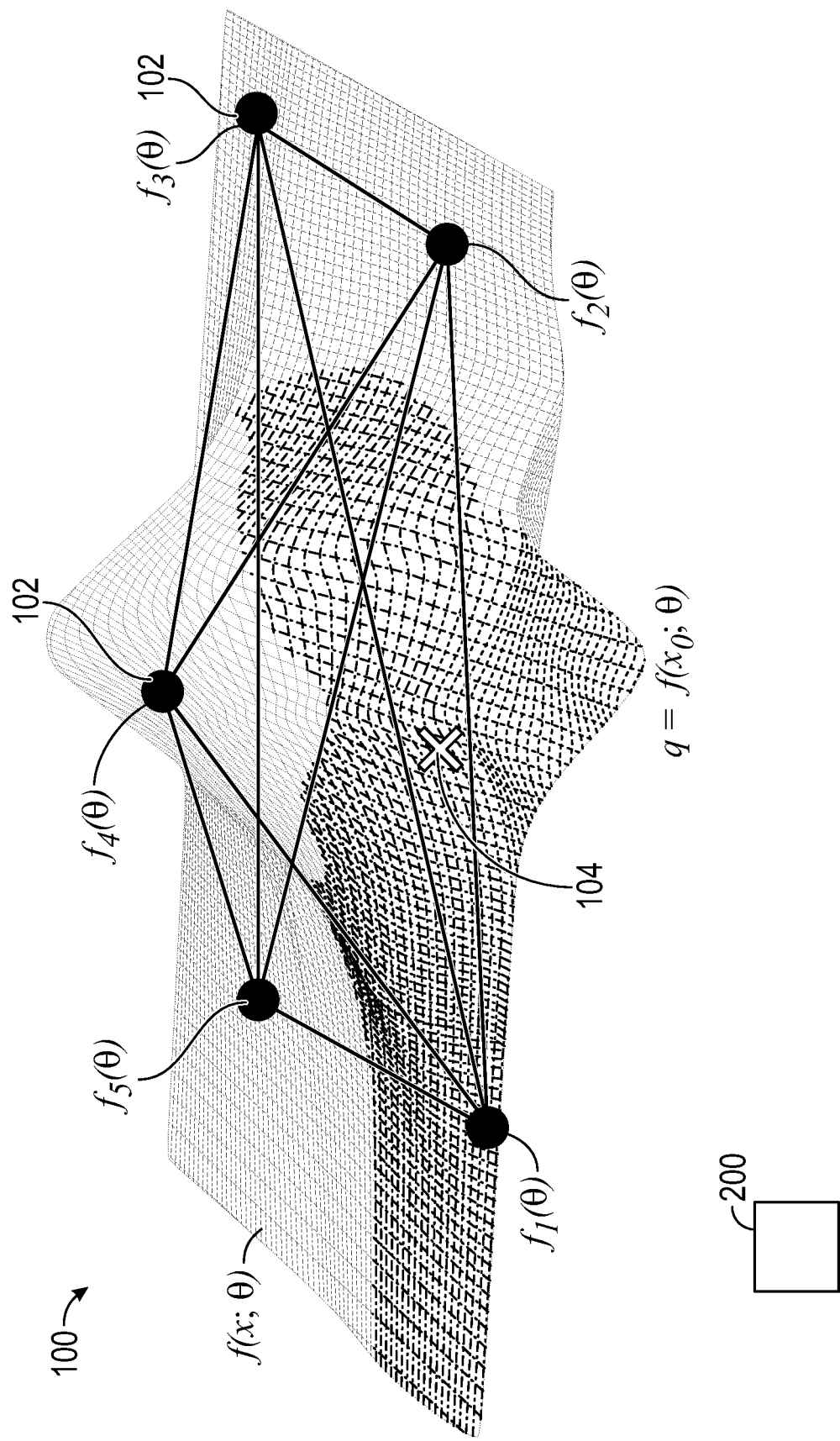
FIG. 1 is a diagram of an exemplary quantum sensor network in accordance with examples of the present disclosure.

The present disclosure relates generally to the field of quantum operations. More specifically, the present disclosure provides at least a system and method for the measurement of field properties using quantum sensor networks.

Aspects of the present disclosure are described in detail with reference to the drawings wherein like reference numerals identify similar or identical elements.

Although the present disclosure will be described in terms of specific examples, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary aspects illustrated in the drawings, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure.

Referring to FIG. 1, a diagram of an example quantum system 100 coupled to a field $f(x; \theta)$ is shown. The quantum system 100 may include two or more highly entangled quantum sensors 102. Examples of quantum sensors 102 may include qubit sensors, nitrogen-based sensors, diamond-based sensors, trapped ion sensors, interferometers, and/or superconducting qubit sensors. The quantum sensors 102 (e.g., a quantum sensor network) may be arranged in a one or more dimensional system. The quantum sensors may be in a Greenberger-Horne-Zeilinger state (GHZ state). Although qubit systems are used as an example, it is contemplated that the disclosed technology may be used in qudit systems (arbitrary finite-level systems) as well.

The field $f(x; \theta)$ is analytically parameterized by the vector of parameters $\theta$. The qubit sensors are fixed at positions $\{x_1, \ldots, x_d\}$. While the functional form of $f(x; \theta)$ is known, the parameters $\theta$ are not. The bounds on the precision of measuring an arbitrary analytic function $q(\theta)$ of the parameters $\theta$ are saturable. The disclosed technology can be applied to many problems, including optimal placement of quantum sensors 102, field interpolation, and the measurement of functionals of parametrized fields.

A set of quantum sensors 102 at positions $\{x_1, \ldots, x_d\}$ is locally probing a physical field $f(x; \theta)$, which depends on a set of parameters $\theta \in \mathbb{R}^k$. For example, at each position $x_i$ in the network, a quantum sensor 102 is coupled to a field $f(x; \theta)$. The functional form of $f(x; \theta)$ is assumed to be known, but the values of the parameters $\theta$ are unknown. The parameters may be the positions of several known charges, and $f(x; \theta)$ one of the components of the resulting electric field. An objective is to estimate a function of the parameters $q(\theta)$. This could be, for instance, the field value $q(\theta)=f(x; \theta)$ at a position $x_0$ without sensor, or the spatial average $q(\theta)=\int_R dx f(x; \theta)$ over some region R of interest.

The disclosed systems and methods utilize entanglement to obtain the highest accuracy allowed by quantum mechanics in estimating the quantity $q(\theta)$. One example problem that the disclosed technology may be used to solve is to estimate the field value $q=f(x; \theta)$ at a location $x_0$ 104 without a sensor. Entanglement refers to a physical phenomenon where a quantum state of each particle of the group cannot be described independently of the state of the others, including when the particles are separated by a large distance.

In another example, consider a network of three quantum sensors 102 that are locally coupled to a field $f(x; \theta_1, \theta_2)$ parametrized by $\theta=(\theta_1, \theta_2)$. The field amplitudes at the positions of the quantum sensors 102 shall be $f_1=\theta_1$, $f_2=\theta_2$, $f_3=\theta_1+\theta_2$, respectively, where $f_i(\theta)=f(x_i; \theta)$. For example, one possible strategy to measure the value of $q(\theta_1, \theta_2)=\theta_1$ is to simply use the first sensor to measure II. On the other hand, $$\frac{1}{2}(f_1 - f_2 + f_3)$$

may also be measured, thereby potentially gaining accuracy by harnessing entanglement between the individual sensors.

The disclosed technology provides the benefit of estimating a function of the parameters, $q(\theta_1, \ldots, \theta_k)$, instead of estimating a given function $F(f_1, \ldots, f_d)$ of independent local field amplitudes $f_1, \ldots, f_d$. Due to the correlation of the local field amplitudes, there are many measurement strategies that need to be considered and compared in terms of accuracy. The disclosed technology may be used for many applications, including, for example, optimal spatial sensor placement and field interpolation.

The quantum system 100 generally includes a collection of d quantum subsystems, called quantum sensors 102, each associated with a Hilbert space $\mathcal{H}_i$. The full Hilbert space is $\mathcal{H} = \otimes_{i=1}^{d} \mathcal{H}_i$. A collection of field amplitudes $f(\theta) = (f_1(\theta), \ldots, f_d(\theta))^T$ is imprinted onto a quantum state, represented by an initial density matrix $p_{in}$, through the unitary evolution: $p_f = U(f) p_{in} U(f)^\dagger$. Here, $\theta = (\theta_1, \ldots, \theta_k)^T$ is a set of independent unknown parameters. The unitary evolution is generated by the Hamiltonian:

$$\hat{H} = \hat{H}_c(t) + \sum_{i=1}^{d} \frac{1}{2} f_i(\theta) \hat{\sigma}_i^z, \tag{Eqn. 1}$$

with the Pauli operators $\hat{\sigma}_i^{x,y,z}$ acting on qubit i and $f_i(\theta) = f(x_i, \theta)$ the local field amplitude at the position of the $i^{th}$ quantum sensor 102. The term $\hat{H}c(t)$ is a time-dependent control Hamiltonian, which may include coupling to ancilla qubits. Ancilla qubits are extra bits being used, for example, to determine measurement outcomes for check operators without needing to measure them directly.

A given function of the parameters $q(\theta)$ is estimated. The estimate is based on measurements of the final state $p_f$, specified by a set of operators $\{\hat{\Pi}_\xi\}$ that constitute a positive operator-valued measure (POVM) with $\int d\xi \hat{\Pi}_\xi = 1$. This experiment may be repeated many times to estimate the function of interest $q(\theta)$ via an estimate $\tilde{q}$ obtained from the data. The sensor placements enable an estimate of a true value of $\theta$ to be obtained, which ensures the problem is solvable. This implies that the number d of quantum sensors 102 should be larger than k. The choice of initial state $p_{in}$, control Hamiltonian $\hat{H}c(t)$, and POVM $\{\hat{\Pi}_\xi\}$ defines a protocol to estimate $q(\theta)$.

$\theta$ is treated as a stochastic variable, and the true value of $\theta$ is denoted by $\theta'$. Thus $q(\theta)$ is again a stochastic quantity, whereas $q(\theta')$ is a specific number obtained by evaluating the function at the true value $\theta'$. Indices i, j=1, ..., d are used to label quantum sensors 102 and m, n=1, k to label parameters.

The mean squared error (MSE) of the estimate $\tilde{q}$ from the true value $q(\theta')$ is given by $$\mathcal{M} = \mathbb{E}[(\tilde{q} - q(\theta'))^2] = \text{Var } \tilde{q} + (\mathbb{E}[\tilde{q}] - q(\theta'))^2, \tag{Eqn. 2}$$

where the first and second terms are the variance and estimate bias, respectively. The optimal protocol to measure $q(\theta')$ minimizes $\mathcal{M}$ given a fixed amount of total time t. To determine the optimal protocol, lower bounds on $\mathcal{M}$ are derived using quantum information theory techniques. These bounds are then saturated by specific protocols.

To derive a saturable lower bound on $\mathcal{M}$ that can be achieved in time t, first begin with the following result on a single-parameter estimation. If the unitary evolution of the quantum state is controlled by a single parameter q, then $$\mathcal{M} \geq \frac{1}{\mathcal{F}_Q} \geq \frac{1}{t^2 \|\hat{h}_q\|_s^2}, \tag{Eqn. 3}$$

where $\mathcal{F}_Q$ is the quantum Fisher information, $\hat{h}_q = \partial \hat{H}/\partial q$ as is the generator with $\gamma_{max}$ ($\gamma_{min}$) its largest (smallest) eigenvalue, and $\|\hat{h}_q\|_s = \gamma_{max} - \gamma_{min}$ is the seminorm of $\hat{h}_q$. The first inequality is the quantum Cramér-Rao bound.

It is not obvious that Eqn. 3 may be applied to the problem of estimating $q(\theta)$ as k>1 parameters control the evolution of the state. However, this may be circumvented by considering an infinite set of imaginary scenarios, each corresponding to a choice of artificially fixing k-1 degrees of freedom and leaving only $q(\theta)$ free to vary. Under any such choice, the final quantum state depends on a single parameter and Eqn. 3 may be applied to the example scenario described above.

Additional information can only result in a lower value of $\mathcal{M}$. Therefore, any lower bound on $\mathcal{M}$ derived from any of the imaginary scenarios is also a lower bound for estimating the function $q(\theta)$. For a bound derived this way to be saturable, there must be some choice(s) of artificially fixing k-1 degrees of freedom that does not give us any useful information about $q(\theta)$, and thus yields the sharpest possible bound.

More formally, consider a basis $\{\alpha_1, \alpha_2, \ldots, \alpha_k\}$ such that, without loss of generality, $\alpha_1 = \nabla q(\theta') =: \alpha$. Next, consider any choice of the remaining basis vectors. For any such choice, let a, correspond to a function $q_n(\theta) = \alpha_n \cdot \theta$. For a particular choice of basis, a corresponding set of functions $\{q_1(\theta) = q(\theta), q_2(\theta), \ldots, q_k(\theta)\}$ are considered. Given the values $\{q_n(\theta')\}_{n \geq 2}$ and fixing k-1 degrees of freedom, the resulting problem is now determined by a single parameter and Eqn. 3 applies.

The derivative of H with respect to q, while holding $q_2, \ldots, q_k$ fixed, is $$\hat{h}_q = \frac{\partial \hat{H}}{\partial q}\bigg|_{q_2,\ldots,q_k} = \sum_{i=1}^{d} \frac{1}{2} (\nabla f_i(\theta') \cdot \beta) \hat{\sigma}_i^z, \tag{Eqn. 4}$$

where $$\beta = \left(\frac{\partial \theta_1}{\partial q}, \ldots, \frac{\partial \theta_k}{\partial q}\right)\bigg|_{q_2,\ldots,q_k}$$

Using the chain rule $\beta$ satisfies $\alpha \cdot \beta = 1$.

Every $\beta \in \mathbb{R}^k$ in Eqn. 4 corresponds to a valid choice of the k-1 dimensional subspace spanned by $\{\alpha_n\}_{n \geq 2}$.

Therefore, since $\hat{h}_q$ depends on $\{\alpha_n\}_{n \geq 2}$ only through $\beta$, the tightest bound on $\mathcal{M}$ is found by optimizing over arbitrary choices of $\beta$ subject to the constraint $\alpha \cdot \beta = 1$.

To formulate the corresponding optimization problem, define the matrix G by $$G_{im}(\theta') = \frac{\partial f_i}{\partial \theta_m}(\theta'). \tag{Eqn. 5}$$

G depends on the true value of the parameters $\theta'$. Utilizing, $$\left\|\frac{1}{2}\hat{\sigma}_i^z\right\|_s = 1$$

the seminorm of $\hat{h}_q$ is written as $$\|\hat{h}_q\|_s = \sum_{i=1}^{d} |\nabla f_i(\theta') \cdot \beta| = \|G(\theta')\beta\|_1, \tag{Eqn. 6}$$

-continued with $$\|x\|_1 = \sum_{i=1}^{d} |x_i|$$

the $L^1$ or Manhattan norm. Therefore, for any $\beta$ satisfying $$\alpha \cdot \beta = 1: \quad \text{(Eqn. 7)}$$
$$M \geq \frac{1}{t^2 \|\hat{h}_q\|_s^2} = \frac{1}{t^2 \|G'(\theta')\beta\|_1^2}.$$

In order to obtain the sharpest bound, what is referred to as the bound problem for $G(\theta')$ and $\alpha$ is solved. Given a non-zero vector $\alpha \in \mathbb{R}^k$ and a real d×k matrix G, $$u = \max_{\beta} \frac{1}{\|G\beta\|_1}$$

is computed under the condition $\alpha \cdot \beta = 1$. This is a linear programming problem and may be solved in time that is polynomial in d and k. Hereafter, the resulting sharpest bound is referred to as "the bound."

For clarity of presentation, the protocol that saturates this bound is developed in the case that both the field $f(\theta)$ and the objective $q(\theta)$ are linear in the parameters $\theta$; that is, $f(\theta)=G\theta$, with $\theta$-independent G, and $q(\theta)=\alpha \cdot \theta$. However, the existence of an asymptotically optimal protocol can be proven in the more general case that $f(\theta)$ and $q(\theta)$ are analytic about the true value $\theta'$.

For the linear case, an explicit protocol to measure q and show that it saturates the bound and thus is optimal is shown. The optimal protocol measures the linear combination $$\lambda(f) = w \cdot f, \quad \text{(Eqn. 8)}$$

where f is the vector of local field amplitudes. The vector $w \in \mathbb{R}^d$ is chosen such that $\tilde{\lambda}(f) = \tilde{q}(\theta)$ is an unbiased estimator of $q(\theta')$, and will be optimized to saturate the bound. For d>k, there are many choices of w that satisfy $\lambda = q$.)

For the estimator $\tilde{\lambda}$ to be unbiased, $\mathbb{E}[\tilde{q}] = q(\theta') = \alpha \cdot \theta$. This is achieved by choosing w to satisfy the consistency condition:

$$G^T w = \alpha, \quad \text{(Eqn. 9)}$$

implying:

$$\mathbb{E}[\tilde{q}] = \mathbb{E}[w \cdot f] = (G\theta')^T w = \theta' \cdot (G^T w) = \alpha \cdot \theta'. \quad \text{(Eqn. 10)}$$

Under the assumption $\theta'$, Eqn. 9, may always be satisfied for some w, and therefore the protocol is valid.

$$\text{Var } \tilde{q} = \frac{\|w\|_\infty^2}{t^2}, \quad \text{(Eqn. 11)}$$

where $\|w\|_\infty = \max_i |w_i|$. Since the problem deals with an unbiased estimator, the MSE coincides with the variance of the estimator in Eqn. 11.

In order to find w with the lowest possible value of $\|w\|_\infty$ (i.e., the smallest variance), the "protocol problem" must be solved. The protocol problem may be described as: given a non-zero vector $\alpha \in \mathbb{R}^k$ and a real d×k matrix G, compute $$u' = \min_{w} \|w\|_\infty$$

under the condition $G^T w = \alpha$. The protocol problem may be efficiently solved by generic linear programming algorithms or special-purpose algorithms.

To illustrate that the optimal protocol for solving this problem saturates the bound, the bound problem and protocol problem are equivalent in that $u = u'$. The strong duality theorem for linear programming may be used for solving the protocol problem. It states that, for linear programming problems like the protocol problem, there is a dual problem whose solution is identical to the original problem. In this case, the following dual problem exists:

Dual protocol problem: Given a non-zero vector $\alpha \in \mathbb{R}^k$ and a real d×k matrix G, compute $$u'' = \max_{v} \alpha \cdot v$$

under the condition $\|Gv\|_1 \leq 1$.

The strong duality theorem then implies $u'' = u'$. Additionally, there is a correspondence between the two solution vectors $w^0$ and $v^0$, so that, given the solution vector to one problem, the solution vector to the other may be found.

Let u and u' be the solutions to the bound and protocol problems, respectively. Then $u = u'$.

Proof By the strong duality theorem, the solution of the dual-protocol problem satisfies $u'' = \max_v \alpha \cdot v = u'$. Let the corresponding solution vector of the dual-protocol problem be $v^0$. Define $\beta^0 := v^0/u'$. $\alpha \cdot \beta^0 = u'/u' = 1$, thus $\beta^0$ satisfies the constraint of the bound problem. To prove the theorem $u' \leq u$ and $u \leq u'$ must be shown. On the one hand, provided $\|G\beta^0\|_1 \neq 0$, the condition $\|Gv^0\|_1 \leq 1$ of the dual problem implies $$u' \leq \frac{1}{\|G\beta^0\|_1} \leq \max_{\beta} \frac{1}{\|G\beta\|_1} = u. \quad \text{(Eqn. 12)}$$

On the other hand, for any $\beta$ satisfying the constraint $\alpha \cdot \beta$ of the bound problem and for the optimal $w = w^0$ of the protocol problem satisfying $\|w^0\|_\infty = u'$, Hölder's inequality yields:

$$1 = \alpha \cdot \beta = \quad \text{(Eqn. 13)}$$
$$(G^T w^0)^T \beta = w^0 \cdot (G\beta) \leq \|w^0\|_\infty \|G\beta\|_1 \Rightarrow \frac{1}{\|G\beta\|_1} \leq \|w^0\|_\infty = u'$$

for all $\beta$.

This shows that $u' \geq 1/\|G\beta\|_1$ for all $\beta$, thus $u' \geq u$, which completes the proof.

As a byproduct, eqn. 12 illustrates that $\beta^0$ maximizes $1/\|G\|_1$, and so is the solution vector of the bound problem. The protocol measuring $\lambda$ with optimal w saturates the bound.

Consider three sensors coupled to local field amplitudes $f_1(\theta)=\theta_1$, $f_2(\theta)=\theta_2$, and $f_3(\theta)=\theta_1+\theta_2$. Since $q(\theta)=\theta_1$, so $\alpha=(1, 0)^T$.

$$G^T = \begin{pmatrix} 1 & 0 & 1 \\ 0 & 1 & 1 \end{pmatrix}. \quad \text{(Eqn. 14)}$$

The constraint $\alpha\cdot\beta=1$ implies $\beta=(1, b)^T$ with arbitrary b. The maximum of $1/\|G\beta\|_1$ is achieved for $\beta^0=(1,0)^T$, yielding $u=\frac{1}{2}$. For the protocol problem, the constraint in Eqn. 9 gives $w_1+w_2=1$ and $w_2+w_3=0$. The corresponding minimal value $\|w\|_\infty$ is $u' = 1/2$ for $$w^0 = \left(\frac{1}{2}, -\frac{1}{2}, \frac{1}{2}\right)^T.$$

of Finally, for the dual-protocol problem, the constraint $\|Gv\|_1 \leq 1$ implies $|v_1|+|v_2|+|v_1+v_2| \leq 1$. The solution vector is $v^0=(\frac{1}{2},0)^T$, which yields $u''=\alpha\cdot v^0=\frac{1}{2}$. This explicit example demonstrates that $u=u'=u''$. Furthermore, $\beta^0=v^0/u'$.

The best-entangled weighting strategies and best-unentangled weighting strategies need not be the same. With or without entanglement, estimate $q(\theta)=\theta_1$ by measuring a linear combination $w\cdot f$ with the constraints $w_1+w_3=1$, $w_2+w_3=0$. Without entanglement, the only option is to measure each component of f independently in parallel for time t, yielding a total MSE for $q(\theta)$ of $\|w\|_2^2/t^2$. In stark contrast, for the entangled case, the MSE is given by $\|w\|_\infty^2/t^2$. It is easy to see that minimizing the Euclidean and supremum norm of w, subject to the constraints, does not yield the same result: Without entanglement, $$w = \left(\frac{2}{3}, -\frac{1}{3}, \frac{1}{3}\right)^T$$

is optimal, yielding an MSE of $$\frac{2}{3t^2}.$$

With entanglement, $$w = \left(\frac{1}{2}, -\frac{1}{2}, \frac{1}{2}\right)^T$$

is optimal, with MSE of $$\frac{1}{4t^2}.$$

This simple example snows that to achieve the optimal result with entanglement, the weights w that are optimal generally cannot be used without entanglement.

The results are practically relevant for any situation where one knows the functional form of the field of interest $f(x; \theta)$ and seeks to determine some quantity dependent on the parameters of that field. Examples include functionals of the form $q(\theta)=\int_R dx\, k(x) f(x; \theta)$ with any kernel $k(x)$ and region of integration R. The examples from the introduction correspond to $k(x)=\delta(x-x_0)$ and $k(x)=1$. Since the $\theta$-dependence of $f(x, \theta)$ is analytic, this amounts to evaluating an analytic function $q(\theta)$.

The findings are also relevant for determining the optimal placement of sensors in space, i.e., determining the best locations $x_1, \ldots, x_d$ in the control space X in which they reside. For example, if the sensors are confined to a plane, then $X=\mathbb{R}^2$. This problem clearly consists of two parts: (1) evaluating the best possible MSE for any chosen set of sensor locations and (2) optimizing the result over possible locations. The MSE amounts to the cost function in usual optimization problems. The results solve this first part as it would be used in the inner loop of a numerical optimization algorithm. The full problem, also involving the second part, is a high dimensional optimization in a space of dimension $d\times\dim(X)$ Therefore, in general, one expects that finding the global optimal placement could be quite challenging. However, even finding a local optimum in this space is clearly of practical use.

In aspects, it may be assumed that an individual estimate of the true value $\theta'$ of the parameters may be obtained, one could imagine situations where this assumption is not satisfied. Some such systems are underdetermined and not uniquely solvable. However, in some cases $\theta \to \theta^*$ may be reparametrized in order to satisfy the assumption. For example, if two parameters in the initial parametrization always appear as a product $\theta_1\theta_2$ in both f and q, $\theta_1$ or $\theta_2$ cannot be individually estimated. However, $\theta_1\theta_2 \to \theta_1^*$ may be reparametrized and thus satisfy the initial assumption.

The disclosed technology applies to physical settings beyond qubit sensors, for example, any situation where Eqn. 3 may be applied, the results of the disclosed technology should hold, provided the corresponding seminorm is used for the particular coupling. For example, the disclosed technology may be used by employing a collection of d Mach-Zehnder interferometers where the role of local fields is played by interferometer phases. Here the limiting resource is the number of photons N available to distribute among interferometers and not the total time t. Under the assumption that this conjecture is correct, Eqn. 11 may be replaced with $$M = \frac{\|w\|_1^2}{N^2}$$

and otherwise, everything remains the same as in the qubit sensor example. One could also consider the entanglement-enhanced continuous-variable protocol for measuring linear combinations of field-quadrature displacements. The bound and protocol could be extended to all the scenarios just described or even to the hybrid case where some local fields couple to qubits, some to Mach-Zehnder interferometers, and some to field quadratures. The ultimate attainable limit in such physical settings remains an open question, however.

One could consider the case $d<k$ provided the d sensors are not required to be at fixed locations. For instance, if one had access to continuously movable sensors in a 1D control space X, by the Riesz representation theorem, one could encode any linear functional of $f(x; \theta)$ by moving the sensors according to a particular corresponding velocity schedule. As a simple example, one can consider evaluating the integral of some function of (i.e., one component of) a magnetic field over one-dimensional physical space by moving a qubit sensor through the field and measuring the accumulated phase. One could also consider variations of this work in the context of semiparametric estimation.

Figure 2:
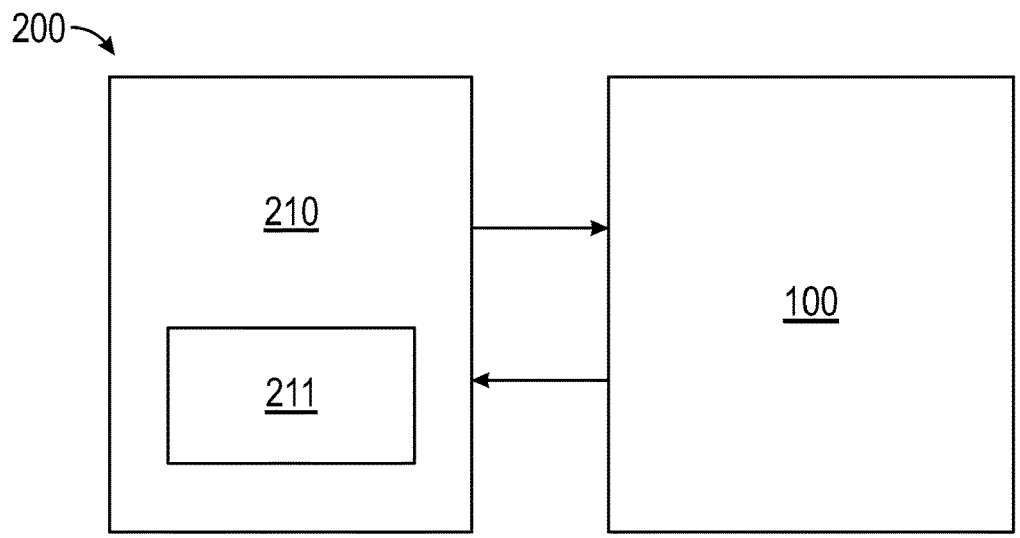
FIG. 2 is a diagram of a method for the measurement of field properties using the quantum system of FIG. 1, in accordance with examples of the present disclosure.
Figure 3:
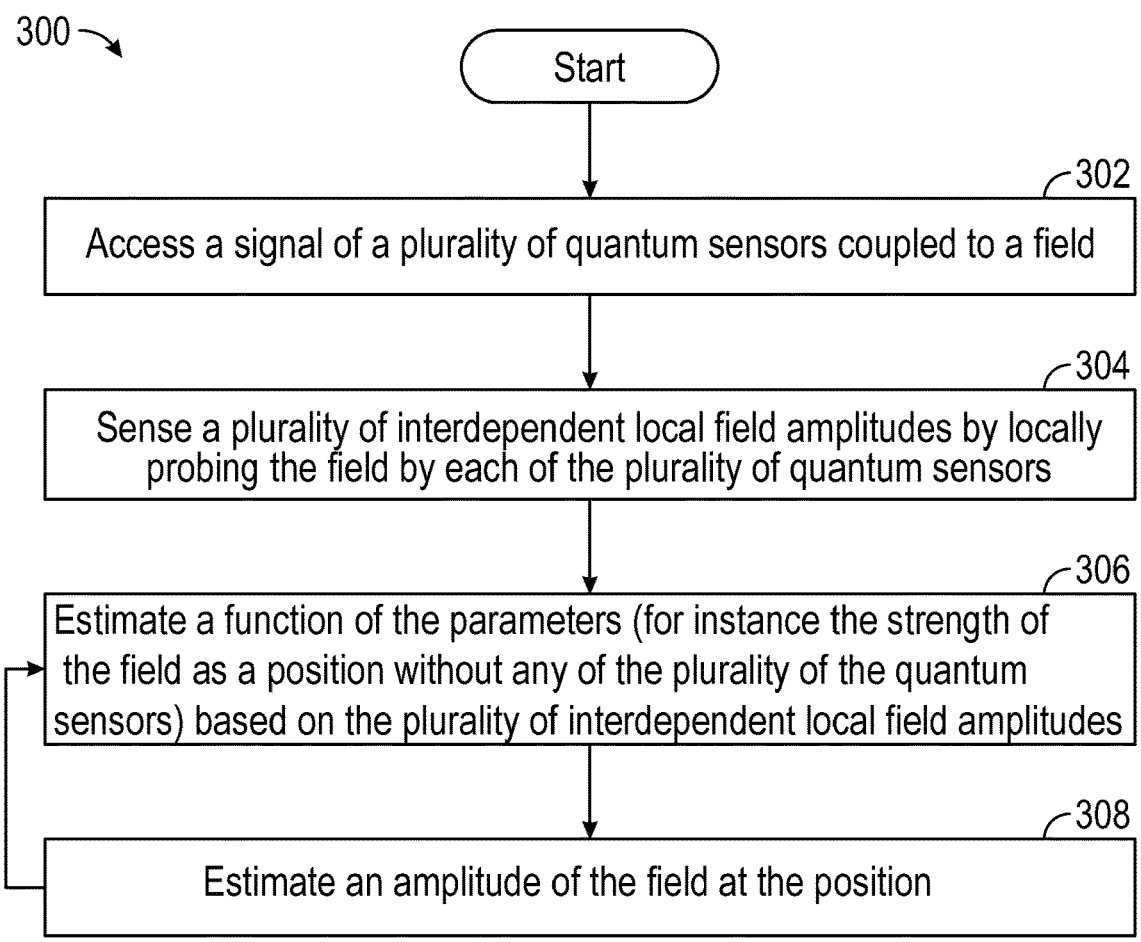
FIG. 3 is a flow diagram for a method for the measurement of field properties using quantum sensor networks, in accordance with examples of the present disclosure.

Referring to FIGS. 2 and 3, a method 300 and illustrative schematic 200 for measurement of field properties using the quantum system 100 of FIG. 1 are shown. The system 200 for measurement of field properties may include a processor 210 (FIG. 2) and a memory 211, including instructions stored thereon, which, when executed by the processor 210, cause the quantum system 100 to perform the steps of method 300.

The processor 210 may be connected to a computer-readable storage medium or a memory 211. The computer-readable storage medium or memory 211 may be a volatile type of memory, e.g., RAM, or a non-volatile type of memory, e.g., flash media, disk media, etc. In various aspects of the disclosure, the processor 210 may be any type of processor such as a digital signal processor, a microprocessor, an ASIC, a graphics processing unit (GPU), a field-programmable gate array (FPGA), or a central processing unit (CPU).

In aspects of the disclosure, the memory 211 can be random access memory, read-only memory, magnetic disk memory, solid-state memory, optical disc memory, and/or another type of memory. In some aspects of the disclosure, the memory 211 can be separate from the processor and can communicate with the processor through communication buses of a circuit board and/or through communication cables such as serial ATA cables or other types of cables. The memory 211 includes computer-readable instructions that are executable by the processor 210 to operate the processor. In other aspects of the disclosure, the system 200 may include a network interface to communicate with other computers or to a server. A storage device may be used for storing data.

Referring to FIG. 3, a method 300 for measurement of field properties using the system 100 of FIG. 1 is shown. The system 100 for the measurement of field properties may include a processor and a memory, including instructions stored thereon, which when executed by the processor, cause the quantum system to perform the steps of method 300.

In aspects of the disclosure, the memory can be random access memory, read-only memory, magnetic disk memory, solid-state memory, optical disc memory, and/or another type of memory. In some aspects of the disclosure, the memory can be separate from the processor and can communicate with the processor through communication buses of a circuit board and/or through communication cables such as serial ATA cables or other types of cables. The memory includes computer-readable instructions that are executable by the processor to operate the processor. In other aspects of the disclosure, the controller may include a network interface to communicate with other computers or to a server. A storage device may be used for storing data.

Initially at step 302, the processor 210 accesses a signal of a quantum system 100. The quantum system 100 includes a plurality of quantum sensors 102 coupled to a field $f(x; \theta)$. The plurality of quantum sensors 102 are entangled. Each sensor of the plurality of quantum sensors 102 is associated with a Hilbert space.

Each sensor of the plurality of quantum sensors 102 is located at a fixed position in the field $f(x; \theta)$ which depends on parameters $\theta$ (FIG. 1). The values of the parameters $\theta$ are unknown. The field $f(x; \theta)$ includes local field amplitudes. Parameters may include, for example, charges and/or magnetic moments.

Next, at step 304, the processor 210 senses a plurality of local field amplitudes corresponding to the plurality of quantum sensors 102 by locally probing the field $f(x; \theta)$ by each of the plurality of quantum sensors 102.

Next, at step 306, the processor 210 estimates a function of the parameters $q(\theta)$ at a position $x_0$ based on the sensed plurality of local field amplitudes. $x_0$ is a position 104 without any of the plurality of quantum sensors 102 (FIG. 1).

In aspects, the processor 210 may determine an optimum quantum sensor 102 placement in the field $f(x; \theta)$ based on the estimated function of the parameters.

In aspects, the processor 210 may determine a mean squared error (MSE) of the estimate $\tilde{q}$ from a true value of the parameters $\theta$. The processor 210 may evaluate the MSE for any set of positions of the plurality of quantum sensors and change the position of each sensor of the plurality of quantum sensors based on the evaluated MSE.

Next, at step 308, the processor 210 estimates an amplitude of the field $f(x; \theta)$ at the position $x_0$ based on the estimated function of the parameters.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different example aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for the measurement of field properties, the system comprising:
   a quantum system including a plurality of quantum sensors coupled to a field, wherein each sensor of the plurality of quantum sensors is located at a position in the field, the position depends on parameters, wherein the plurality of quantum sensors is entangled;

a processor; and a memory, including instructions stored thereon, which, when executed by the processor, cause the quantum system to:

access a signal of the quantum system;

sense a plurality of interdependent local field amplitudes corresponding to the plurality of quantum sensors by locally probing the field by each sensor of the plurality of quantum sensors;

estimate a function of the parameters at a position $x_0$, wherein $x_0$ is a position without any of the plurality of quantum sensors;

estimate an amplitude of the field at the position $x_0$ based on the estimated function of the parameters;

determine a mean squared error (MSE) of the estimated function of the parameters from a true value of the parameters;

evaluate the MSE of the estimated function for any set of positions of the plurality of quantum sensors; and change the position of each sensor of the plurality of quantum sensors based on the evaluated MSE.

2. The system of claim 1, wherein the estimate of the amplitude of the field at a position $x_0$ is based on measurements of a final state of the field, specified by a set of operators $\{\hat{\Pi}_\xi\}$ that constitute a positive operator-valued measure where $\int d\xi \hat{\Pi}_\xi = 1$.

3. The system of claim 1, wherein the field includes local field amplitudes.

4. The system of claim 1, wherein the instructions, when executed, further cause the system to determine an optimum quantum sensor placement in the field based on the estimated function of the parameters.

5. The system of claim 1, wherein the plurality of quantum sensors includes Mach-Zehnder interferometers or qubits.

6. The system of claim 1, wherein each sensor of the plurality of quantum sensors is associated with a Hilbert space.

7. The system of claim 1, wherein values of the parameters at the fixed positions in the field are unknown.

8. A method for the measurement of field properties, the method comprising:

accessing a signal of a quantum system, the quantum system including a plurality of quantum sensors coupled to a field, wherein each sensor of the plurality of quantum sensors is located at a position in the field, the position depends on parameters, wherein values of the parameters are unknown, wherein the plurality of quantum sensors is entangled;

sensing a plurality of interdependent local field amplitudes corresponding to the plurality of quantum sensors by locally probing the field by each sensor of the plurality of quantum sensors;

estimating a function of the parameters at a position $x_0$ based on the sensed plurality of local field amplitudes, wherein $x_0$ is a position without any of the plurality of quantum sensors;

estimating an amplitude of the field at the position $x_0$ based on the estimated function of the parameters;

determining a mean squared error (MSE) of the estimated function of the parameters from a true value of the parameters;

evaluating the MSE of the estimated function for any set of positions of the plurality of quantum sensors; and changing the position of each sensor of the plurality of quantum sensors based on the evaluated MSE.

9. The method of claim 8, wherein the estimate of the field value at a position Xo is based on measurements of a final state, specified by a set of operators $\{\hat{\Pi}_\xi\}$ that constitute a positive operator-valued measure where $\int d\xi \hat{\Pi}_\xi = 1$.

10. The method of claim 8, wherein the field includes local field amplitudes.

11. The method of claim 8, further comprising determining optimum quantum sensor placement in the field based on the estimated function of the parameters.

12. The method of claim 8, wherein the plurality of quantum sensors includes Mach-Zehnder interferometers or qubits.

13. The method of claim 8, wherein each sensor of the plurality of quantum sensors is associated with a Hilbert space.

14. A method for the measurement of field properties, the method comprising:

accessing a signal of a quantum system, the quantum system includes a plurality of entangled quantum sensors coupled to a field, wherein each sensor of the plurality of entangled quantum sensors is located at a position in the field, the position depends on a set of parameters, wherein values of the parameters are unknown;

sensing a local field value corresponding to a signal sensed by each sensor of the plurality of quantum sensors; and estimating a function of the parameters at a first position in the field, wherein the first position is a position in the field without an entangled quantum sensor of the plurality of entangled quantum sensors;

determining a mean squared error (MSE) of the estimated function of the parameters from a true value of the parameters;

evaluating the MSE of the estimated function for any set of positions of the plurality of quantum sensors; and changing the position of each sensor of the plurality of quantum sensors based on the evaluated MSE.

15. The method of claim 14, wherein each of the plurality of quantum sensors is associated with a Hilbert space.

16. The method of claim 15, wherein the plurality of quantum sensors includes Mach-Zehnder interferometers or qubits.

* * * * *